US010690492B2

(12) United States Patent
Wei et al.

(10) Patent No.: US 10,690,492 B2
(45) Date of Patent: Jun. 23, 2020

(54) STRUCTURAL LIGHT PARAMETER CALIBRATION DEVICE AND METHOD BASED ON FRONT-COATING PLANE MIRROR

(71) Applicant: Beihang University, Beijing (CN)

(72) Inventors: Zhenzhong Wei, Beijing (CN); Wei Zou, Beijing (CN); Binhu Chai, Beijing (CN); Yue Min, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 16/308,644

(22) PCT Filed: Mar. 22, 2018

(86) PCT No.: PCT/CN2018/079922
§ 371 (c)(1),
(2) Date: Dec. 10, 2018

(87) PCT Pub. No.: WO2018/228013
PCT Pub. Date: Dec. 20, 2018

(65) Prior Publication Data

US 2020/0132451 A1 Apr. 30, 2020

(30) Foreign Application Priority Data

Jun. 12, 2017 (CN) .......................... 2017 1 0436967

(51) Int. Cl.
*G01B 21/04* (2006.01)
*G01B 11/25* (2006.01)

(52) U.S. Cl.
CPC ........ *G01B 21/042* (2013.01); *G01B 11/2513* (2013.01)

(58) Field of Classification Search
CPC .............. G01B 21/042; G01B 11/2513; G01B 11/2545; B60R 13/0815; G10K 11/162; E04B 1/8409
(Continued)

(56) References Cited

U.S. PATENT DOCUMENTS

2014/0002610 A1 1/2014 Xi et al.

FOREIGN PATENT DOCUMENTS

CN 101308012 A 11/2008
CN 101419708 A 4/2009
(Continued)

OTHER PUBLICATIONS

International Searching Authority, Search Report and Written Opinion issued in International Application No. PCT/CN2018/079922 dated Jun. 25, 2018 (11 pages).

*Primary Examiner* — Tri T Ton
(74) *Attorney, Agent, or Firm* — Wood Herron & Evans LLP

(57) ABSTRACT

The present invention discloses a structural light parameter calibration device and method based on a front-coating plane mirror. The calibration device includes a camera, a laser, a front-coating plane mirror, a flat glass target, and white printing paper. The white printing paper receives a laser beam and presents a real light strip image, and the camera captures the real light stripe image and a mirror light stripe image on the front-coating plane mirror. Feature points are used to determine a rotation matrix, a translation vector, and a vanishing point for the image. The present invention achieves better quality of light stripe and better extraction accuracy, provides feature points with micron-level positional accuracy and more calibration points, and features higher calibration accuracy and more stable calibration results.

11 Claims, 6 Drawing Sheets

(58) Field of Classification Search
USPC .................................................. 356/600–640
See application file for complete search history.

(56) References Cited

FOREIGN PATENT DOCUMENTS

| | | | |
|---|---|---|---|
| CN | 101526338 | A | 9/2009 |
| CN | 102564348 | A | 7/2012 |
| CN | 103411553 | A | 11/2013 |
| CN | 105783773 | A | 7/2016 |
| CN | 106017327 | A | 10/2016 |
| CN | 106595517 | A | 4/2017 |
| CN | 107121109 | A | 9/2017 |

STRUCTURAL LIGHT PARAMETER CALIBRATION DEVICE AND METHOD BASED ON FRONT-COATING PLANE MIRROR

CROSS-REFERENCE TO RELATED APPLICATIONS

This application is a national phase entry of, and claims priority to, International Application No. PCT/CN2018/079922, filed Mar. 22, 2018 which claims priority to Chinese patent application number 201710436967.8, filed on Jun. 12, 2017, each of which is incorporated herein by reference in its entirety.

TECHNICAL FIELD

The invention relates to the field of visual measurement, and more specifically, to a structural light parameter calibration device and method.

BACKGROUND

Structural light three-dimensional vision measurement is widely used in industrial measurement and other fields because of the advantages of non-contact, fast speed and moderate accuracy. The calibration accuracy of a structured light vision sensor determines the final detection accuracy level of structural light three-dimensional vision measurement. The line structured light vision sensor calibration process includes two aspects of cameral internal parameter calibration and light plane parameter calibration. The calibration process mainly uses the internal parameters of the camera and other auxiliary tools to determine the plane equation of the light plane in the camera coordinate system.

Commonly-used calibration methods of structured light sensors mainly include a free moving target method and a mechanical motion adjustment method. The free moving target method usually uses a one-dimensional target, a two-dimensional planar target, or a three-dimensional target to complete calibration of optical plane parameters. This method features easy target processing and high calibration accuracy and efficiency and is thus widely used. The mechanical motion adjustment method usually uses mechanical motion platform with an encoder, mechanical arms and other devices to calibrate structured light sensors. This method has many processes requiring manual adjustment, and the accuracy thereof mainly depends on the accuracy of the mechanical motion platform.

Chinese Patent Application No. CN200810239083.4 discloses a method for calibrating structured light parameters based on a one-dimensional target. The method uses at least three feature points with known spatial constraints of a one-dimensional target, and is combined with a perspective projection equation, to calculate spatial three-dimensional coordinates of the feature points in a camera system coordinate system according to the length constraints and direction constraints of the feature points and fit the spatial three-dimensional coordinates to obtain the light plane equation. This method requires high processing accuracy for one-dimensional targets and is therefore sensitive to image noise.

Chinese Patent Application No. CN200710121397.X discloses a calibration method for structural parameters of a structured light vision sensor. The method uses a plane target with multiple nonlinear feature points, obtains the center of a light stripe and coordinates of nonlinear feature points on a target image by moving a position of a plane target for many times, calculates the three-dimensional coordinates of the center point of the light stripe in the camera coordinate system by homography matrix, and fits the light plane equation according to the three-dimensional coordinates. This method is widely used because of its high calibration efficiency and high precision. However, this method cannot extract high-precision feature points while extracting high-quality light stripe images.

Chinese Patent Application No. CN201510307016.1 discloses a calibration method of a line structure light vision sensor based on a parallel double cylindrical target. The method uses a freely moving parallel double cylindrical target, places the target at least once in a suitable position, to extract the center of the light stripe image and to fit the elliptical image of the light stripe in the image. This method establishes an equation between two spatial ellipses and their corresponding images based on perspective projection transformation, solves the light plane equation by constraints that the elliptical short axis is the same as the diameter of the cylinder. This method requires a high-precision three-dimensional calibration target and high processing cost, and it is difficult to obtain a high-quality calibration image due to factors such as reflection and occlusion.

From the above analysis, it can be seen that existing structural light parameter calibration methods require high-precision targets with feature points or high-precision geometrically constrained targets. However, due to the current level of material processing technology, it is difficult to achieve the positional accuracy or geometric constraint accuracy of the feature points to the micron level while ensuring the image quality of the light stripe, and it may cause deviation if the transformation matrix is calculated by using an image homography matrix method. When a laser stripe is projected on metal or a target such as a ceramic target, the extraction accuracy of the center of the stripe may be deteriorated due to strong reflection or diffuse reflection.

It would be desirable to improve the devices and methods for structural light parameter calibration to overcome these and other deficiencies of conventional designs.

SUMMARY

An object of the present invention is to provide a structural light parameter calibration device based on a front-coating plane mirror, which can realize fast and highly-precise calibration of light plane parameters of a structured light sensor, and simple manufacturing and maintenance of its target and easy onsite operation.

In order to achieve the object, the present invention according to one embodiment includes: A structural light parameter calibration device and method based on a front-coating plane mirror, where the method includes: placing the front-coating plane mirror and a flat glass target in front of a camera, capturing, by the camera, a feature point image and a mirror image on the flat glass target simultaneously, establishing a virtual binocular measurement model, using a spatial distance of adjacent feature points of the flat glass target as a constraint, solving an optimal solution of a rotation matrix and a translation vector between a coordinate system of a plane mirror and a coordinate system of a real camera by using a nonlinear optimization method, and obtaining an image vanishing point of a candidate feature point by using a least square method; and placing white printing paper in front of the front-coating plane mirror, projecting, by a laser, a beam onto white printing paper, matching sub-pixels by using image vanishing points and a linear interpolation methods to obtain matching points capturing, by the camera, a real light stripe image, calculating three-dimensional coordinates of the matching points, and fitting to solve a light plane equation by using a least square method.

In another embodiment, the present invention provides a structural light parameter calibration device, where the device includes: an area array camera, a line laser, a front-coating plane mirror, a flat glass target, and white printing paper, where: the area array camera is used to simultaneously capture a light stripe image projected by the laser on the white printing paper and a mirror image of a light stripe in the front-coating plane mirror, and calculate a rotation matrix and a translation vector between a coordinate system of the plane mirror and a coordinate system of the camera; the line laser is used to project a laser beam onto the white printing paper to form the light stripe; feature points around the front surface of the front-coating plane mirror are used to calculate the rotation matrix and the translation vector between the coordinate system of the plane mirror and the coordinate system of the camera; coated film in the central area of the front surface of the front-coating plane mirror is used to mirror the laser light stripe projected on the white printing paper and feature points on the flat glass target; the flat glass target is used to optimize the rotation matrix between the coordinate system of the plane mirror and the coordinate system of the camera, provide constraints for the translation vector, calculate a vanishing point of an image, match two light stripe images by using the vanishing point; and the white printing paper is used to receive the beam projected by the laser and present the light stripe image. The white printing paper has a flat surface without apparent visible crease and is non-reflective and light-proof.

In one aspect, the front-coating plane mirror, the flat glass target and the white printing paper together constitute a target device for calibrating structured light parameters of a light plane. The central portion of the front surface of the plane mirror is coated with an aluminum film or a silver film. The peripheral area of the front surface of the plane mirror has photolithography feature points. Compared with the plane mirror whose back surface is coated with film, the front-coating plane mirror cannot be affected by the refraction phenomenon caused by the thickness of the flat glass target to improve the calibration accuracy. The feature points around the front-coating plane mirror are in the form of a checkerboard, a dot matrix or a grid.

In another aspect, a structural light parameter calibration method includes steps of: a. calibrating internal parameters of a camera in a line structured light vision sensor; placing a flat glass target and the front-coating plane mirror in a clear imaging area in front of the camera, adjusting a brightness of a light source, and capturing a real feature point image and a mirror feature image on the flat glass target; and correcting the real feature point image and the mirror feature image; b. establishing a coordinate system of a real camera, a coordinate system of a mirror camera, a coordinate system of the front-coating plane mirror, and a coordinate system of an inverse plane mirror; solving a rotation matrix and a translation vector between the coordinate system of the front-coating plane mirror and the coordinate system of the real camera; solving a rotation matrix and a translation vector between the coordinate system of the mirror camera and the coordinate system of the real camera, solving a transformation relationship between a left-handed image coordinate system and a right-hand image coordinate system, and establishing a virtual binocular measurement model; obtaining an optimal solution of the rotation matrix and the translation vector between the coordinate system of the front-coating plane mirror and the coordinate system of the real camera by using a nonlinear optimization method; c. calculating a distance between adjacent feature points in the horizontal direction and the vertical direction of a flat glass target; determining and selecting candidate feature points based on a threshold, and matching the candidate feature points; obtaining an image vanishing point by using a least square method; and d. placing white printing paper in a clear imaging area in front of the camera for multiple times, extracting the center of a real light stripe image and the center of a mirror light stripe image respectively, matching sub-pixels of the center of the real light stripe and the center of the mirror light stripe according to the vanishing point, calculating three-dimensional coordinates of the center point of the light stripe using the virtual binocular measurement model, fitting a light plane by using a least square method, and solving light plane parameters.

In a further aspect, the step a. further includes steps of: placing a flat glass target capable of freely moving in the clear imaging area in front of the camera; forming an angle between the front-coating plane mirror and the flat glass target; ensuring that feature points on the flat glass target and mirrored feature points thereof, as well as most of feature points of the front-coating plane mirror are located in the clear imaging area; and adjusting brightness of light sources of the front-coating plane mirror and the flat glass target separately, such that the feature points thereon are clearly imaged, the width of the feature points and the width of edge pixels are 1-3 pixels, and undistorted images are obtained by using camera internal calibration parameters and the image correction method.

In another aspect, the step b. further includes steps of: (1) establishing a right-handed coordinate system for the coordinate system of the real camera, the coordinate system of the mirror camera, the coordinate system of the front-coating plane mirror, and the coordinate system of the inverse plane mirror, where an origin of a coordinate system of a real camera image is in the upper left corner of the image, and an origin of a coordinate system of a mirror camera image is in the upper right corner of the image; (2) after the feature points on the front-coating plane mirror are extracted, calculating a homography matrix by using a camera imaging model, and then solving the rotation matrix and the translation vector between the coordinate system of the front-coating plane mirror and the coordinate system of the real camera; (3) respectively solving the rotation matrix and the translation vector between the coordinate system of the front-coating plane mirror and the coordinate system of the inverse plane mirror, and the rotation matrix and the translation vector between the coordinate system of the inverse plane mirror and the coordinate system of the mirror camera by using a mirror principle, and solving the rotation matrix and the translation vector between the coordinate system of the mirror camera and the coordinate system of the real camera by using the above-obtained rotation matrixes and the translation vectors; (4) converting the left-handed image coordinate system to the right-hand image coordinate system, establishing image coordinates of a mirrored light stripe captured by the real camera in the left-handed coordinate system due to mirroring reasons, while maintaining an ordinate of the principal point of the image unchanged, establishing image coordinates of a mirror stripe in the right-hand image coordinate system, and establishing the virtual binocular measurement model based on the transformation matrix and the translation vector between the coordinate system of the mirror camera and the coordinate system of the real camera solved in step (3) as well as an internal parameter matrix obtained by camera calibration; and (5) using a minimum distance between a measured value and a true value of adjacent feature points in the horizontal direction and the vertical direction on the flat glass target as a spatial distance constraint, obtaining the optimal solution of the rotation matrix and the translation vector between the coordinate system of the front-coating plane mirror and the coordinate system of the real camera, and the optimal solution of the rotation matrix and the translation vector between the coordinate system of the real camera and the coordinate system of the mirror camera by using a Levenberg-Marquardt nonlinear optimization method.

In yet another aspect, the step c. further includes steps of: (1) extracting and matching the real feature points on the plane glass target and the mirror feature points; according to the optimal solution of the rotation matrix and the translation vector between the coordinate system of the real camera and the coordinate system of the mirror camera, substituting the image coordinates of the real feature points on the plane glass target and the image coordinates of the corresponding mirror feature points into the virtual binocular measurement model established in step b respectively, to calculate three-dimensional coordinates of the real feature points on the flat glass target in coordinate system of the real camera; calculating a spacing of two adjacent feature points in the horizontal direction and in the vertical direction on the flat glass target respectively; and selecting a feature point whose spacing is smaller than a set spacing threshold as a real candidate feature point; (2) connecting the real candidate feature point on the flat glass target and the mirror candidate feature point corresponding to the real candidate feature points with a line, using this line as a matching polar line, taking a distance from the image vanishing point to the polar line as an objective function, and solving an intersection of all lines by using a linear least square method, where the intersection is the image vanishing point.

In a further aspect, the step d. also includes steps of: (1) securing the front-coating plane mirror in the clear imaging area in front of the camera; adjusting the brightness of the light source to make the feature points on the front-coating plane mirror clear, where each edge pixels occupies 1-3 pixels; placing the white printing paper in the clear imaging area in front of the camera for multiple times; projecting the laser beam onto the white printing paper and forming a clear and complete mirror image in front of the front-coating plane mirror; when the white printing paper is placed at each position, the camera simultaneously capturing a real light stripe image projected on the white printing paper and a mirror light stripe image mirrored by the front-coating plane mirror, and using the same as a calibration image; (2) extracting a center of a light stripe of the real light stripe and the mirrored light stripe on the calibration image respectively by using a Steger method; connecting the center of the real light stripe and the image vanishing point obtained in step c with a line, and using this line as a polar line of the center of the current light stripe; and locating two points on the center of the mirrored light stripe closest to the polar line as two candidate points and connecting the two candidate points, and using an intersection of the polar line and the line connecting the two candidate points as a sub-pixel matching point of the center of the real light stripe; and (3) substituting image coordinates of the center of the real light stripe and image coordinates of the sub-pixel matching point into the virtual binocular measurement model established in step b, to calculate three-dimensional coordinates of the center point of the light stripe, and fitting a light plane equation $aX+bY+cZ+d=0$ by using the least square method, where a, b, c, d in the equation are the solved light plane parameters.

It will be understood that the present invention achieves the following technical objectives and advantages. The present invention provides a device based on a front-coating plane mirror to calibration line structure light sensor parameters, the device uses the LED light source target for structure light calibration and provides feature points with micron-level positional accuracy. However, it is difficult to achieve micron-level positional accuracy for metal targets or ceramic targets while ensuring that the stripes are extractable. Compared with a method in which the flat target obtains the positional relationship between target coordinates and a camera coordinate system through a homography relationship, the system and method of the present invention obtains a more precise positional relationship between the target coordinate system and the camera coordinate system by using a stereo optimization method, the present invention uses image information instead of a camera polar constraint to achieve sub-pixel matching of the center of the stripe; therefore, the present invention improves the accuracy of sub-pixel matching. Compared with the metal target, white printing paper provides better image quality of light stripe and better extraction accuracy of the center of the light stripe; in addition, more calibration points can be provided to ensure the stability of the calibration results, and the front-coating plane mirror can effectively eliminate the effects of glass refraction. By the above hardware improvement and algorithm innovation, the present invention realizes high-precision and high-stability line structure light sensor calibration, and it is easy to process and operate the front-coating plane mirror. The device and the method provided by the present invention can achieve fast real-time calibration of structural light parameters.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrates one or more embodiments of the invention and, together with the general description given above and the detailed description given below, explains the one or more embodiments of the invention.

DETAILED DESCRIPTION

Embodiments of the invention are illustrated below with reference to the accompanying drawings. The preferred embodiments described here are used only to describe and explain the present disclosure, but not to limit the present disclosure. Embodiments of the invention are configured to: separate a feature point image from a light stripe image based on a front-coating plane mirror and white printing paper; simultaneously capture a feature point image and the light stripe image to obtain images with high quality, and to provide feature point coordinates with high positional accuracy as well as the center coordinates of the light stripe with high extraction accuracy; use a symmetric virtual binocular measurement system consisting of a single camera and mirror to calibrate light plane parameters of the structural light; match the center of the light stripe based on an image vanishing point; and use the front-coating plane mirror to eliminate the effects of glass refraction. The present invention improves the calibration accuracy of the structural light parameters in a plurality of ways.

Based on the structured light parameter calibration device, in combination with a specific implementation manner, the present invention will be further described in detail by taking a video camera and a line laser as an example in one embodiment.

Figure 1:
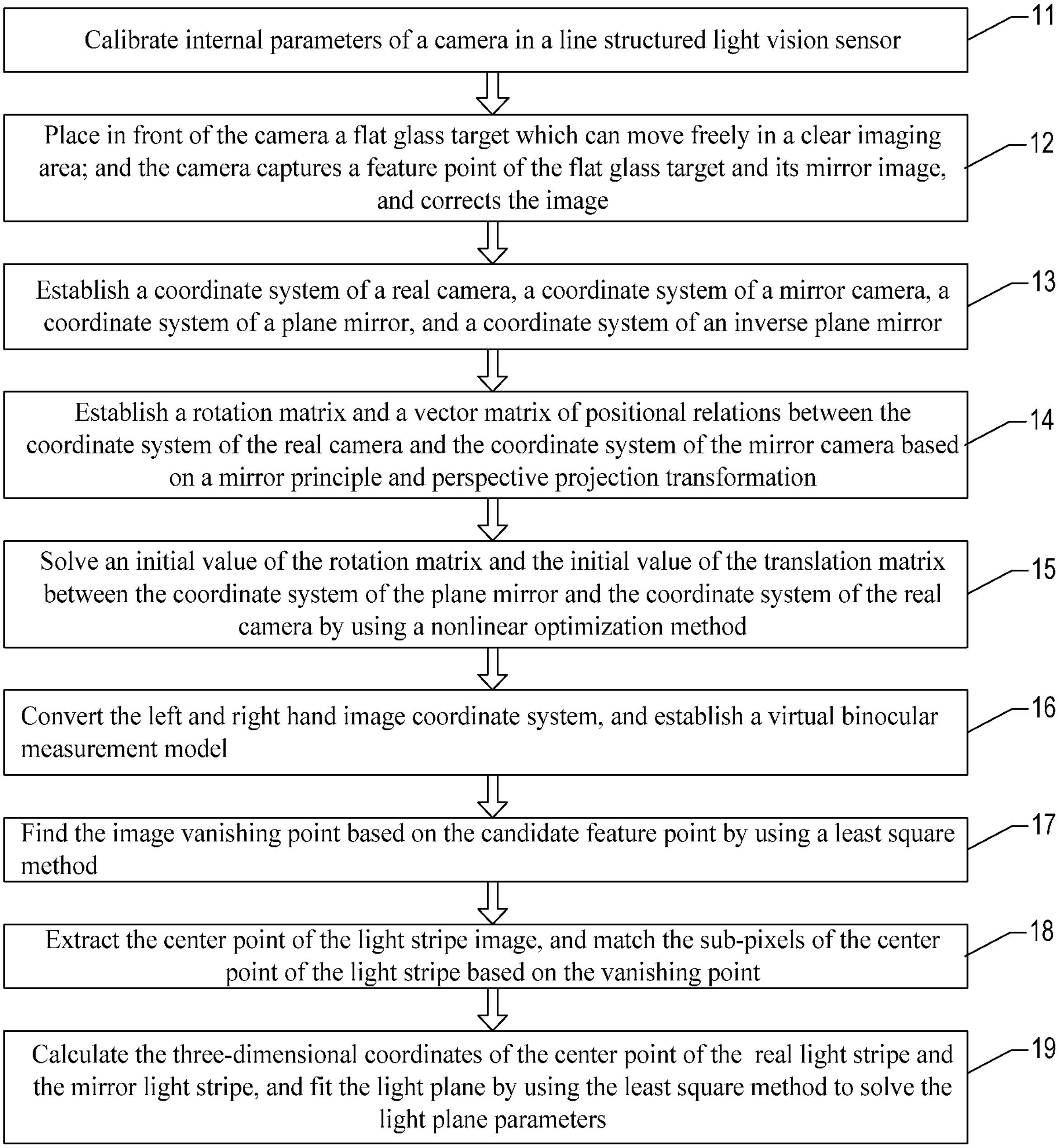
FIG. 1 is a flowchart of a method of calibration of structured light vision sensor parameters according to one embodiment of the present invention.

As shown in FIG. 1, the structural light parameter calibration method based on a front-coating plane mirror mainly includes the following steps.

Step 11: Calibrate internal parameters of a camera in a line structured light vision sensor.

Calibrating the camera in the line structured light vision sensor is equivalent to solving the internal parameters of the camera, which is:

$$A=\begin{bmatrix}\alpha_x & \gamma & u_0\\ 0 & \alpha_y & v_0\\ 0 & 0 & 1\end{bmatrix},\ \begin{cases}\hat{u}=u\left(1+k_1(u^2+v^2)+k_2(u^2+v^2)^2\right)\\ \hat{v}=v\left(1+k_1(u^2+v^2)+k_2(u^2+v^2)^2\right)\end{cases}\tag{1}$$

In the formula (1), $\alpha_x=f/d_x$, $\alpha_y=f/d_y$, $\alpha_x$ is the scale factor of the u axis, $\alpha_y$ is the scale factor of the v axis, and the scale factor is also called the effective focal length. $d_x$ is the pixel spacing in the horizontal direction, $d_y$ is the pixel spacing in the vertical direction; $u_0$ and $v_0$ represent the optical center, also called the principal point coordinates; γ is a non-perpendicular factor for the u-axis and the v-axis. $(\hat{u}, \hat{v})$ is the real pixel coordinate, (u, v) is the ideal pixel coordinate; $k_1$, $k_2$ are radial distortion parameters. The specific solution method of each parameter is described in detail in Zhang Zhengyou's article "A flexible new technique for camera calibration [R]. Microsoft Corporation, NSR-TR-98-71, 1998."

Figure 2:
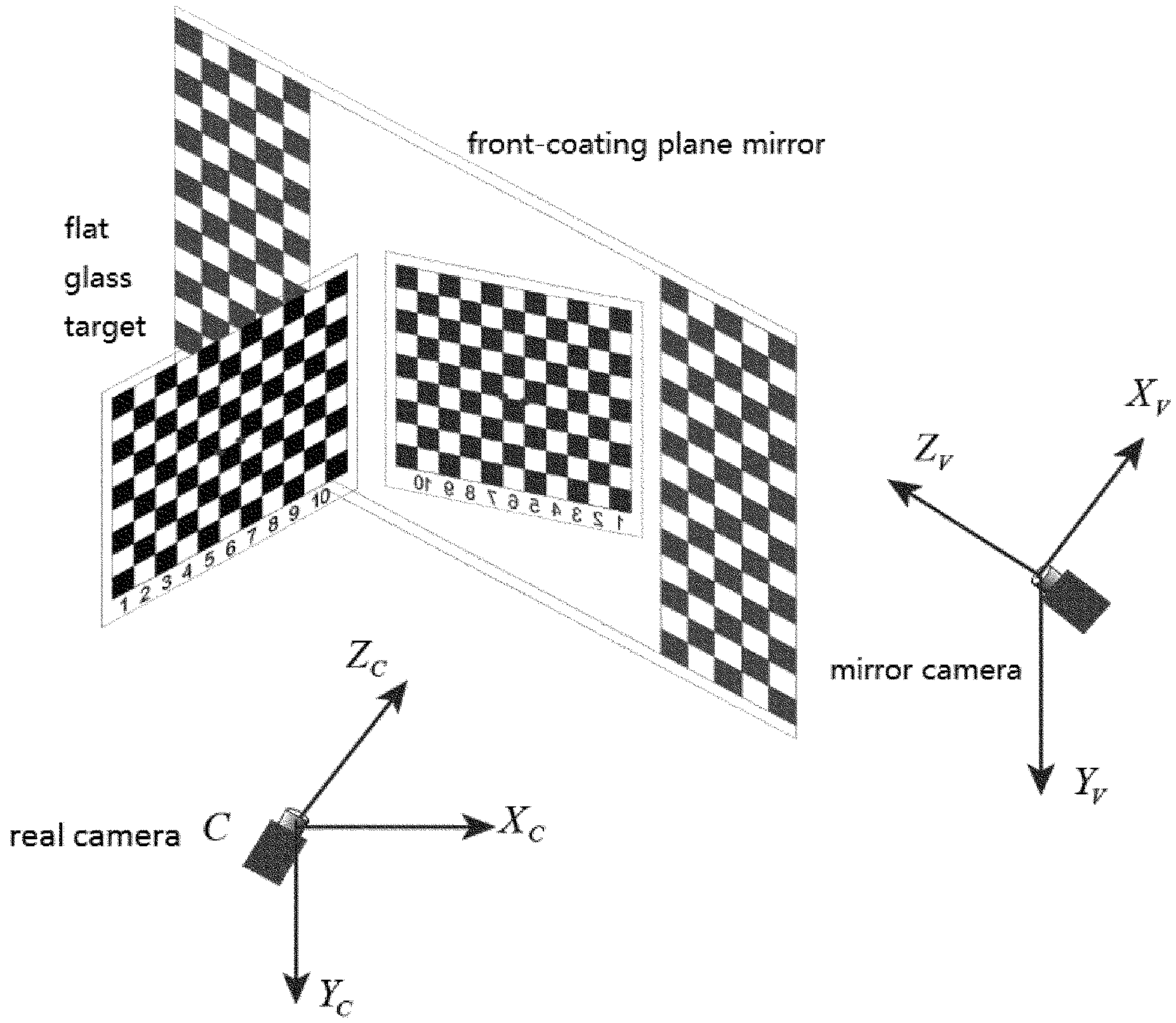
FIG. 2 is a schematic diagram showing a calibration of structured light vision sensor parameters according to embodiments of the present invention.

Step 12: Place in front of the camera a flat glass target which can move freely in a clear imaging area. There is a preset angle between the position of the front-coating plane mirror and the position of the flat glass target. The flat glass target is mirrored, to make sure that the feature points in the flat glass target and the feature points in the front-coating plane mirror are simultaneously imaged in the camera. The brightness of the light source of the front-coating plane mirror and the flat glass target are adjusted separately. The camera takes images, the camera calibration parameters obtained in step 11 are used to correct the image to obtain an undistorted image, and the process is shown in FIG. 2.

Step 13: Establish a coordinate system of a real camera, a coordinate system of a mirror camera, a coordinate system of a plane mirror, and a coordinate system of an inverse plane mirror.

Establish the coordinate system of the real camera $O_C$-$X_CY_CZ_C$, where $O_C$ is the origin of the coordinate system of the real camera. $X_CY_CZ_C$ represents the coordinate axes in three directions of the coordinate system of the real camera. Establish the coordinate system of the mirror camera $O_V$-$X_VY_VZ_V$. In order to solve the conversion relationship between coordinate systems easily, the coordinate system of the mirror camera $O_V$-$X_VY_VZ_V$ is established as a right-hand coordinate system, where $O_V$ is the origin of the coordinate system of the mirror camera. $X_VY_VZ_V$ represents the coordinate axes in three directions of the coordinate system of the mirror camera. Establish the coordinate system of the plane mirror $O_m$-$X_mY_mZ_m$, where $O_m$ is the origin of the coordinate system of the plane mirror, $X_mY_mZ_m$ represents the coordinate axes in three directions of the coordinate system of the plane mirror. Establish the coordinate system of the inverse plane mirror $O_{mm}$-$X_{mm}Y_{mm}Z_{mm}$, where $O_{mm}$ is the origin of the coordinate system of the inverse plane mirror. $X_{mm}Y_{mm}Z_{mm}$ represents the coordinate axes in three directions of the coordinate system of the inverse plane mirror.

Step 14: Establish a rotation matrix and a vector matrix of positional relations between the coordinate system of the real camera and the coordinate system of the mirror camera based on a mirror principle and perspective projection transformation.

Step 141: Solve an initial value of the rotation matrix and the initial value of the translation matrix between the coordinate system of the plane mirror $O_m$-$X_mY_mZ_m$ and the coordinate system of the real camera $O_C$-$X_CY_CZ_C$.

The specific method is as follows: $R_C^m$ is the rotation matrix that transform from the coordinate system of the plane mirror $O_m$-$X_mY_mZ_m$ to the coordinate system of the real camera $O_C$-$X_CY_CZ_C$. $t_C^m$ is the translation matrix that transform from the coordinate system of the plane mirror $O_m$-$X_mY_mZ_m$ to the coordinate system of the real camera $O_C$-$X_CY_CZ_C$. Same as the method of monocular camera calibration, the method for solving rotation matrix and translation matrix is introduced in Zhang Zhengyou's article "A flexible new technique for camera calibration, IEEE Trans Pattern Anal. Mach. Intell., 22(11), pp. 1330-1334 (2000)." The method for extracting the checkerboard corner points is referred in the article "A New Sub-Pixel Detector for X-Corner in Camera Calibration Targets[C], WSCG '2005 short Papers Proceedings, 13th International Conference in Central Europe on Computer Graphic, Visualization and Computer Vision, 2005, Plzen, Czech Republic."

Step 142: Solve the positional relationship between the coordinate system of the real camera and the coordinate system of the mirror camera.

The specific method is as follows: The method of establishing positional relationship between the coordinate system of the real camera and the coordinate system of the mirror camera is described in the article "Zhenying Xu, Yun Wang, Chuan Yang, Multi-camera global calibration for large-scale measurement based on plane mirror, Optik, 126 (2015), 4149-4154," and the article "Guangjun Zhang, Xiuzhi Li., A calibration method for foot and eye of Mobile robot, Robot 2007.29(3)." The following formula can be obtained from the articles:

$$R_V^C=R_V^m R_m^C=R_V^m(R_C^m)^{-1},\ t_V^C=t_V^m-R_V^m(R_C^m)^{-1}t_C^m \quad (2)$$

$$R_C^V(R_V^C)^{-1},\ t_C^V=-(R_V^C)^{-1}\cdot t_V^C \quad (3)$$

Where, $R_V^C$ is the rotation matrix which transforms from the coordinate system of the real camera $O_C$-$X_CY_CZ_C$ to the coordinate system of the mirror camera $O_V$-$X_VY_VZ_V$. $t_V^C$ is the translation vector which transforms from the coordinate system of the real camera $O_C$-$X_CY_CZ_C$ to the coordinate system of the minor camera $O_V$-$X_VY_VZ_V$. $R_C^V$ is the rotation matrix which transforms from the coordinate system of the minor camera $O_V$-$X_VY_VZ_V$ to the coordinate system of the real camera $O_C$-$X_CY_CZ_C$. $t_V^C$ is the translation matrix which transforms from the coordinate system of the minor camera $O_V$-$X_VY_VZ_V$ to the coordinate system of the real camera $O_C$-$X_CY_CZ_C$.

Step 15: Convert the left-hand and right-hand image coordinate system, and establish a virtual binocular measurement model.

Step 151: Convert the left-hand image coordinate system to the right-hand image coordinate system.

The specific conversion method is as follows: (u, v) is the imaging point of the center point on the line of the real light stripe in the image coordinate system of the real camera, (u', v') is the imaging point of the center point on the line of the mirror light stripe in the image coordinate system of the real camera, the principle is to shoot a real stripe image by a minor camera. Due to the principle of mirror symmetry, the image coordinates at this time are same as the coordinates imaged by the mirror camera in the left-handed coordinate system. In order to facilitate the measurement of the binocular system, the left-handed coordinate system of the mirror camera is converted into a right-hand coordinate system. The transformation formula of the image coordinate system is:

$$\begin{cases} u_c = \dfrac{x_c}{d_x} + u_0 \\ v_c = \dfrac{y_c}{d_y} + v_0 \end{cases} \Leftrightarrow \begin{cases} u_v = 2u_0 - u_c = -\dfrac{x_c}{d_x} + u_0 \\ v_v = \dfrac{y_v}{d_y} + v_0 \end{cases} \quad (4)$$

Then have:

$$K_C = \begin{bmatrix} f_x & s & u_0 \\ 0 & f_y & v_0 \\ 0 & 0 & 1 \end{bmatrix},\ K_V = \begin{bmatrix} -f_x & s & u_0 \\ 0 & f_y & v_0 \\ 0 & 0 & 1 \end{bmatrix} \quad (5)$$

Herein, $K_C$ is an internal parameter in the right-handed coordinate system established by the real camera. $K_V$ is an internal parameter in the left-handed coordinate system established by the mirror camera. $(u_c,v_c)$ is the image coordinates obtained by the real camera. $(u_v,v_v)$ is the image coordinates in the right-hand coordinate system captured by the mirror camera. s is the distortion factor, $d_x$ is the pixel spacing in the horizontal direction, $d_y$ is the pixel spacing in the vertical direction; $u_0$ and $v_0$ represent the optical center, also called the principal point coordinates;

Step 152: Establish a virtual binocular measurement model.

The specific method is as follows: The coordinate system of the real camera is taken as the world coordinate system. According to the binocular measurement principle, the following formula can be obtained:

$$z_1 = \begin{bmatrix} u \\ v \\ 1 \end{bmatrix} = K_C[I\ \ 0]\begin{bmatrix} X \\ Y \\ Z \\ 1 \end{bmatrix} = H\begin{bmatrix} X \\ Y \\ Z \\ 1 \end{bmatrix} = \begin{bmatrix} h_1 & h_2 & h_3 & h_4 \\ h_5 & h_6 & h_7 & h_8 \\ h_9 & h_{10} & h_{10} & h_{12} \end{bmatrix}\begin{bmatrix} X \\ Y \\ Z \\ 1 \end{bmatrix} \quad (6)$$

$$z_2 = \begin{bmatrix} u' \\ v' \\ 1 \end{bmatrix} = K_V[R_V^C\ \ t_V^C]\begin{bmatrix} X \\ Y \\ Z \\ 1 \end{bmatrix} = M\begin{bmatrix} X \\ Y \\ Z \\ 1 \end{bmatrix} = \begin{bmatrix} m_1 & m_2 & m_3 & m_4 \\ m_5 & m_6 & m_7 & m_8 \\ m_9 & m_{10} & m_{10} & m_{12} \end{bmatrix}\begin{bmatrix} X \\ Y \\ Z \\ 1 \end{bmatrix} \quad (7)$$

Here $(u,v,1)^T$ is the homogeneous coordinate of the center of the real light stripe, $(u',v',1)_T$ is the homogeneous coordinate of the center of the mirror light stripe, $z_1$, $z_2$ are scale Factor, $$H = K_C[I\ \ 0] = \begin{bmatrix} h_1 & h_2 & h_3 & h_4 \\ h_5 & h_6 & h_7 & h_8 \\ h_9 & h_{10} & h_{10} & h_{12} \end{bmatrix},$$

$$M = K_V[R_V^C\ \ t_V^C] = \begin{bmatrix} m_1 & m_2 & m_3 & m_4 \\ m_5 & m_6 & m_7 & m_8 \\ m_9 & m_{10} & m_{10} & m_{12} \end{bmatrix},$$

H is the projection matrix of the real camera, M is the projection matrix of the mirror camera, $[X,Y,Z,1]^T$ is the homogeneous coordinate of the three-dimensional coordinates of the center of the real light stripe.

Step 16: After the nonlinear optimization with Levenberg-Marquardt method, obtain the optimal solution of rotation matrix and the optimal solution of translation vector between the coordinate system of the plane mirror $O_m$-$X_mY_mZ_m$ to the coordinate system of the real camera $O_C$-$X_CY_CZ_C$. The optimization objective function is as follows:

$$f(\varepsilon) = \min\sum_i^{m-1}\sum_j^{n-1}\left(\left|\hat{D}_C(\tilde{R}_C^m, \tilde{t}_C^m) - D_C\right| + \left|\hat{D}_V(\tilde{R}_C^m, \tilde{t}_C^m) - D_V\right|\right) \quad (8)$$

Here $\varepsilon=\tilde{R}_C^m,\tilde{t}_C^m$, $(R_C^m,t_C^m)$ is the transformation matrix that from plane mirror coordinate system to camera coordinate system, $\tilde{R}_C^m,\tilde{t}_C^m$ is the optimal solution of $(R_C^m,t_C^m)$. $\hat{D}_C(\tilde{R}_C^m,\tilde{t}_C^m)$ is the spatial distance of adjacent feature points measured on a flat glass target, $D_C$, $D_V$ are the true distance of adjacent feature points, $\tilde{D}_V(R_C^m,t_C^m)$ is the spatial distance of mirror adjacent feature points measured on a flat glass target, i(i=1, 2, . . . m−1) is the number of horizontal intervals of the feature points, j(j=1, 2, . . . n−1) is the number of vertical intervals of the feature points.

Step 17: Find the image vanishing point based on the candidate feature point by using a least square method.

The specific method is as follows: $\tilde{m}_C^i=(u_C^i,v_C^i,1)^T$ is the homogeneous coordinate of the feature points on the flat glass target, $\tilde{m}_V^i=(u_V^i,v_V^i,1)^T$ is the homogeneous coordinate of the mirror feature points on the flat glass target. Calculate the spacing between adjacent two feature points in the horizontal direction and the vertical direction separately by using the optimized parameters ($R_V^C$,$t_V^C$). If the spacing between the two feature points is less than the set threshold (threshold is 0.008 mm), get the two feature points as candidate points. Determine the connection between the real image point and the mirror image point by the following formula:

$$l_i=\tilde{m}_C^i\times\tilde{m}_V^i \quad (9)$$

The intersection of the two groups of connections is $l=l_i\times l_j(i\neq j)$, i and j represent different lines. Due to the error in feature point extraction, each group of connections cannot be completely crossed. Solve the intersection of all connection lines as the image vanishing point by linear least squares. The objective function is:

$$f(v)=\min\sum_{i=1}^{n}(l_i^T v)^2 \quad (10)$$

Herein, v is the homogeneous coordinate of the image vanishing point.

Figure 3:
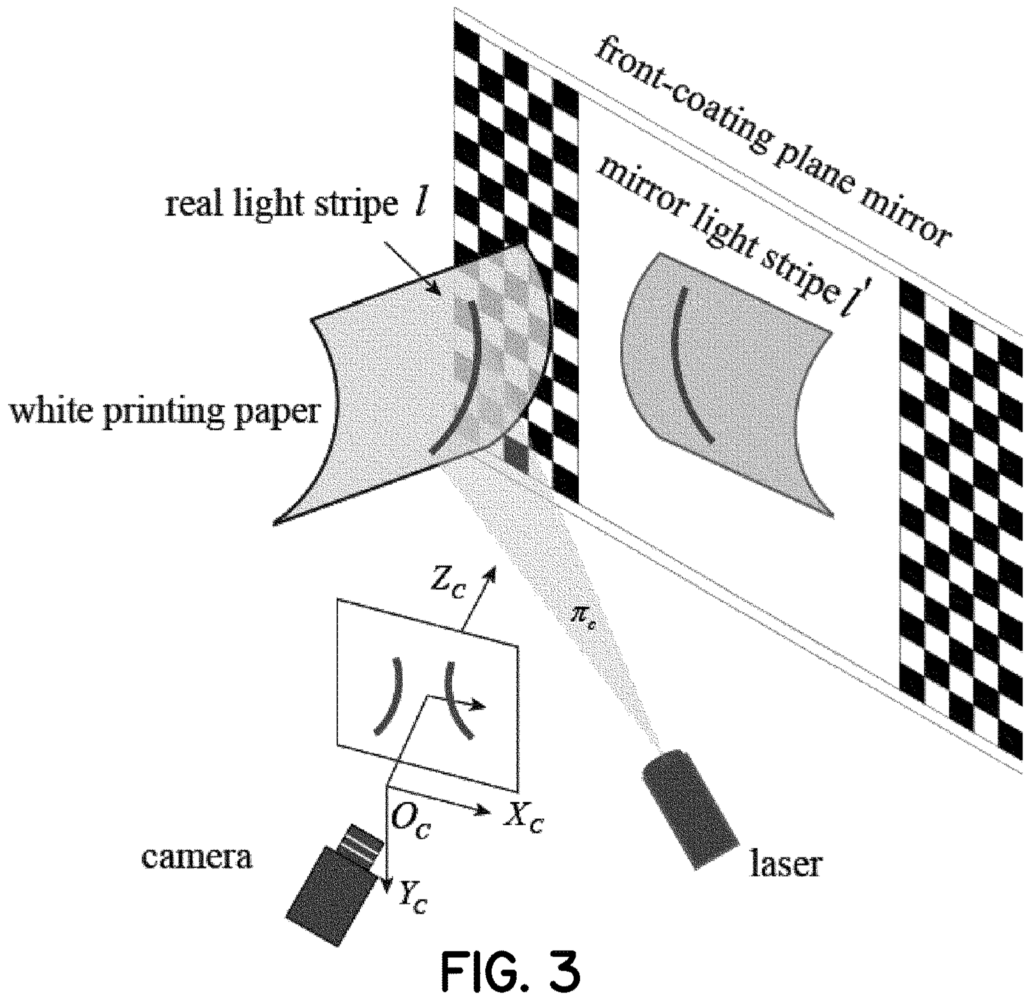
FIG. 3 is a schematic diagram showing a calibration of structured light vision sensor parameters according to other embodiments of the present invention.

The line structured light vision sensor consists of a camera and a laser. FIG. 3 shows the line structural light vision sensor device. In FIG. 3, l denotes a real light stripe projected by the laser on the white printing paper, and l' denotes a mirror light stripe mirrored by the front-coating plane mirror. $O_C$-$X_CY_CZ_C$ represents the coordinate system of the real camera, $O_V$-$X_VY_VZ_V$ represents the coordinate system of the mirror camera.

Step 18: Extract the center point of the light stripe image and match the sub-pixels of the center point of the light stripe.

Step 181: The method for obtaining the center point of the light stripe image is as follows:

Extract the image coordinates of the center of all the light stripes in the captured light stripe image. Obtain undistorted image coordinates of the center of all the light stripes in the image by image distortion correction method. The method of extracting the center of the light stripe can use the method of "An unbiased detector of curvilinear structures" described by Steger. The correction method is described in "Machine Vision. Guangjun Zhang, Science Press." The image coordinates of the center of the light stripe mentioned later are the distortion-free image coordinates after distortion correction.

Step 182: The sub-pixel matching method of the center point of the light stripe is as follows:

Pick a point ($u_C^i$,$v_C^i$) on the real light stripe image which on the white printing paper. Connect the line of point ($u_C^i$,$v_C^i$) and the image vanishing point as the polar line $l_{ei}$ of the center of the real light stripe. Calculate the distance from each point on the mirror light stripe to the polar line, connect the nearest two points ($u_V^i$,$v_V^i$) and ($u_V^{i+1}$, $v_V^{i+1}$) to get the formula:

$$l_i=\left(\frac{v_V^{i+1}-v_V^i}{u_V^{i+1}-u_V^i},\,-1,\,\frac{u_V^{i+1}v_V^i-v_V^{i+1}u_V^i}{u_V^{i+1}-u_V^i}\right) \quad (11)$$

The coordinates of the corresponding subpixel matching points are:

$$P_i=[l_{ei}]_x l_i \quad (12)$$

Herein, Pi is the matching point at the center of the mirrored light stripe corresponding to the center of the real light stripe. $l_{ei}$, $l_i$ are vector representation of the line, $[l_{ei}]_x$ is the antisymmetric matrix of $l_{ei}$, ($u_V^i$,$v_V^i$) and ($u_V^{i+1}$,$v_V^{i+1}$) are the image coordinates of any two adjacent points in the center of the mirrored light stripe image.

Step 19: Rebuild the center point of the real light stripe and the center point of the mirror light stripe in three dimensions by the virtual binocular measurement model, and fit the light plane to obtain the light plane parameters by least squares method.

Step 20: Evaluate the calibration accuracy of the structural light parameter calibration device and method provided by the present invention.

Figure 8:
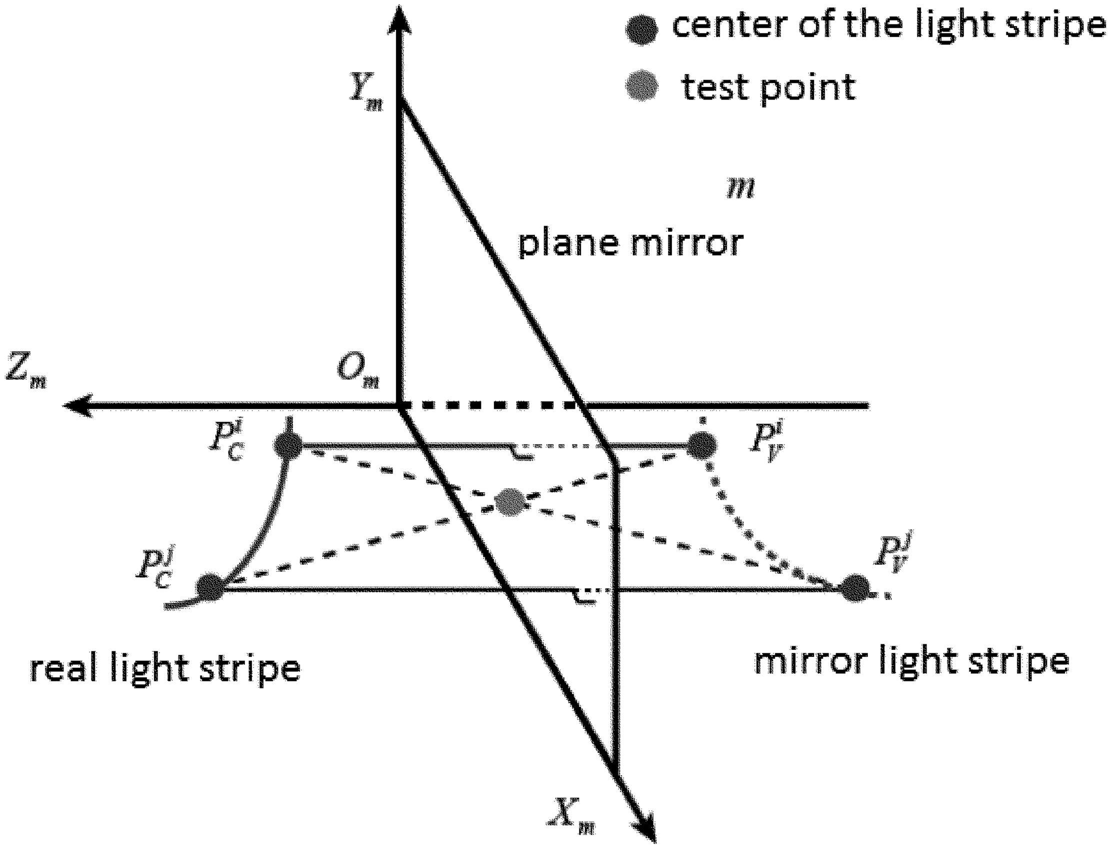
FIG. 8 shows an evaluation process of the calibration accuracy of the structural light parameter calibration device, in accordance with embodiments of the invention.

The evaluation method for the calibration accuracy of the light plane parameters of structured light is as follows:

Step 201: First, randomly select two points that are not adjacent on the center of the real light stripe image. Calculate the corresponding matching point on the mirror light stripe image according to the method mentioned in the Step 18 and the Step 19. As shown in FIG. 8, here, $p_C^i(u_C^i,v_C^i)$ and $p_C^j(u_C^j,v_C^j)$ are two points that are not adjacent in the center of the real light stripe image. $p_V^i(u_V^i,v_V^i)$ and $p_V^j(u_V^j,v_V^j)$ are two points on the center of the mirrored light stripe image, $p_V^i(u_V^i,v_V^i)$ and $p_V^j(u_V^j,v_V^j)$ corresponds to $p_C^i(u_C^i,v_C^i)$ and $p_C^j(u_C^j,v_C^j)$.

Step 202: Secondly, connect point $p_C^i(u_C^i,v_C^i)$ and the point $p_V^j(u_V^j,v_V^j)$ to obtain a straight line $l_A$ connect point $p_C^j(u_C^j,v_C^j)$ and the point $p_V^i(u_V^i,v_V^i)$ to obtain a straight line $l'_A$, line $l_A$ and line $l'_A$ intersect at point $p_t(u_t^i,v_t^i)$, point $p_t(u_t^i,v_t^i)$ which named test point must be located on the front-coating plane mirror under ideal conditions. Find the three-dimensional coordinates of the space corresponding to the test point $p_t(u_t^i,v_t^i)$ as the true value. The image coordinates of the test point $p_t(u_t^i,v_t^i)$ are:

$$\begin{cases} u_t^i=\dfrac{\left(\dfrac{u_C^iv_V^j-u_V^jv_C^i}{u_C^i-u_V^j}\right)-\left(\dfrac{u_C^jv_V^i-u_V^iv_C^j}{u_C^j-u_V^i}\right)}{\left(\dfrac{v_C^i-v_V^j}{u_C^i-u_V^j}-\dfrac{v_C^j-v_V^i}{u_C^j-u_V^i}\right)} \\ v_t^i=\dfrac{(v_C^i-v_V^j)(u_C^jv_V^i-u_V^iv_C^j)-(u_C^j-u_V^i)(u_C^iv_V^j-u_V^jv_C^i)}{(v_C^i-v_V^j)(u_C^j-u_V^i)-(u_C^i-u_V^j)(v_C^j-v_V^i)} \end{cases} \quad (13)$$

The three-dimensional coordinates of the test point are:

$$(X_t^i,Y_t^i,Z_t^i)=R_C^mH_{horm}^{-1}[u_t^i,v_t^i,1]^T+t_C^m \quad (14)$$

Herein, $H_{horm}^{-1}$ is the inverse matrix of the homography matrix corresponding to the front-coating plane mirror.

Step 203: Solve the three-dimensional coordinates of the center point of the real light stripe in the camera coordinate system $P_C^i$, according to the internal parameters of the camera and a light plane equation obtained by calibration. The three-dimensional coordinates of the matching points on the center of the mirror light stripe in the camera coordinate system are:

$$P_V^i=R_V^CP_C^i+t_V^C \quad (15)$$

The measured value of the test point is:

$$(X_m^i,Y_m^i,Z_m^i)^T=(P_C^i+sP_V^j)/(1+s) \quad (16)$$

Here, $s=\|P_C^i-P_V^i\|/\|P_C^j-P_V^j\|$, $P_C^j=(X_C^i,Y_C^i,Z_C^i)^T$ and $P_V^i=(X_V^i,Y_V^i,Z_V^i)^T$ are the three-dimensional coordinates of the two points matching the real light stripe and the mirror light stripe in the camera coordinate system.

Step 204: The spatial distance between the ideal value and the measured value is:

$$\Delta d_i=\sqrt{(X_m^i-X_t^i)^2+(Y_m^i-Y_t^i)^2+(Z_m^i-Z_t^i)^2} \quad (17)$$

Calculate the RMS error of the three-dimensional coordinates of the test point through two points that are not adjacent to each other in the center of multiple real light stripe images. Evaluate the calibration accuracy of the light plane of structured light by the RMS error.

Example Embodiment

Figure 4:
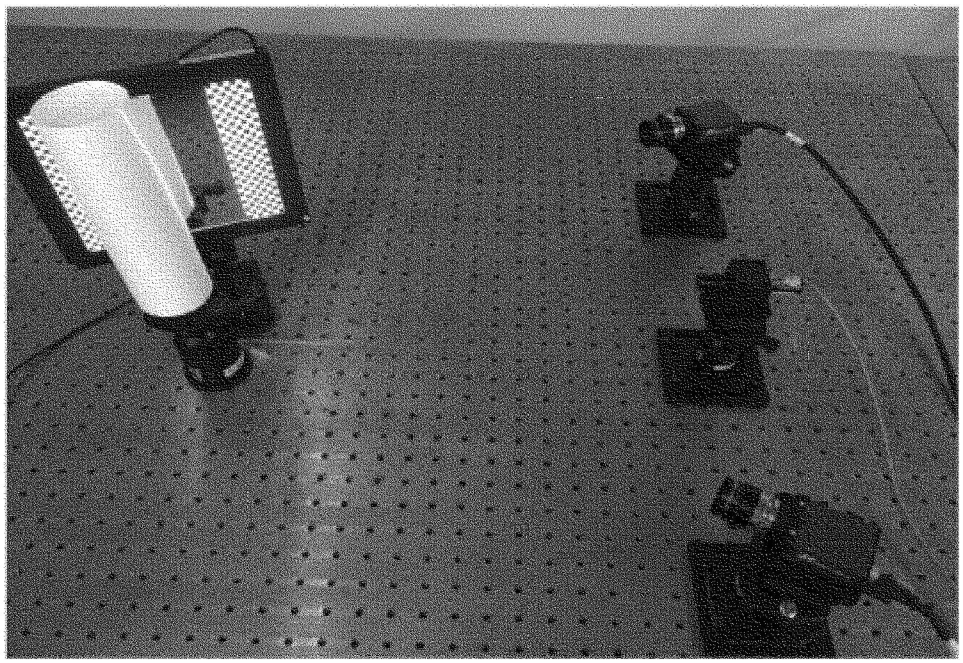
FIG. 4 is a photographic top perspective view of test equipment set up for calibration of structured light vision sensor parameters according to embodiments of the present invention.

The camera model is from Allied Vision Technologies, with a 23 mm focal length Schneider optical lens, the image resolution is 1600×1200 pixels. The field of view of the line structured light vision sensor is approximately 200 mm×160 mm. The measurement distance is 650 mm. The laser uses a single-line red laser with a wavelength of 635 nm (e.g., a wavelength of visible light in the unit of nm) and a power of 50 mW. The positional accuracy of the feature points in the front-coating plane mirror is 2 um, and the positional accuracy of the feature points in the flat glass target is 2 um as shown in FIG. 4. The front-coating plane mirror uses a double-sided polished optical glass.

First, according to the method described in step 11, the internal parameter calibration result of the camera is: $\alpha_x=5174.34$; $\alpha_y=5175.03$; $\gamma=0$; $u_0=815.19$; $v_0=597.72$; $k_1=-0.19$; $k_2=0.58$ Where, $\alpha_x$ is the scale factor of the u axis, $\alpha_y$ is the scale factor of the v axis, the scale factor is also called the effective focal length. $\gamma$ is a non-perpendicular factor for the u-axis and the v-axis. $u_0$ and $v_0$ represent the optical center, also called the principal point coordinates; $k_1$ and $k_2$ are radial distortion parameters of lens.

Figure 5:
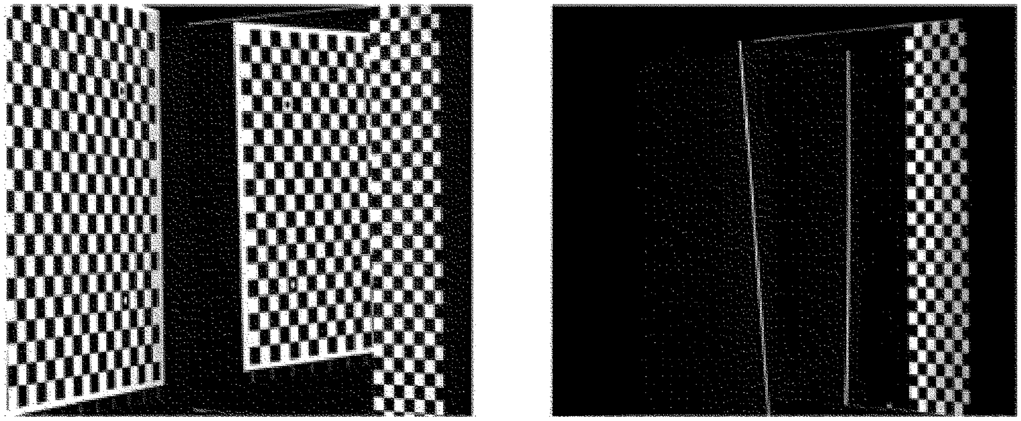
FIG. 5 show images acquired by cameras during the calibration of structured light vision sensor parameters of FIG. 4.

According to the method described in step 12, the camera takes images of the front-coating plane mirror and images of the flat glass target, and the images are shown in FIG. 5. The image on the left shows the acquired image of the flat glass target and the front-coating plane mirror. The image on the right shows the real light stripe image and the mirror light stripe image of the laser beam projected onto the white printing paper.

According to the method described in step 13 and step 14, the obtained rotation matrix and translation vector between the coordinate system of the plane mirror and the camera coordinate system are respectively $$R_C^m=\begin{bmatrix}0.0136 & 0.8218 & -0.5679\\ 0.9999 & -0.0107 & 0.0085\\ 0.0009 & -0.5679 & -0.8218\end{bmatrix},\ t_C^m=\begin{bmatrix}59.4347\\ -50.6129\\ 652.8342\end{bmatrix}.$$

The rotation matrix and translation vector between the coordinate system of the real camera and the coordinate system of the mirror camera are $$R_V^C=\begin{bmatrix}-0.3510 & -0.0097 & 0.9363\\ 0.0097 & 0.9999 & 0.0139\\ -0.9363 & 0.0139 & -0.3508\end{bmatrix},\ t_V^C=\begin{bmatrix}-650.3336\\ -9.6888\\ 938.2294\end{bmatrix}.$$

According to the method described in step 15 and step 16, the obtained optimal solution of the rotation matrix and the optimal solution of the translation vector between the coordinate system of the plane mirror and the camera coordinate system is $$R_C^m=\begin{bmatrix}0.0134 & 0.8218 & -0.5696\\ 0.9999 & -0.0105 & 0.0084\\ 0.0009 & -0.5697 & -0.8218\end{bmatrix},\ t_C^m=\begin{bmatrix}59.2712\\ -50.6101\\ 652.5985\end{bmatrix}.$$

The optimal solution of the rotation matrix and the optimal solution of the translation vector between the coordinate system of the real camera and the coordinate system of the mirror camera are $$R_V^C=\begin{bmatrix}-0.3510 & -0.0095 & 0.9363\\ 0.0095 & 0.9999 & 0.0137\\ -0.9363 & 0.0137 & -0.3509\end{bmatrix},\ t_V^C=\begin{bmatrix}-649.9912\\ 9.5376\\ 937.7698\end{bmatrix}.$$

Figure 6:
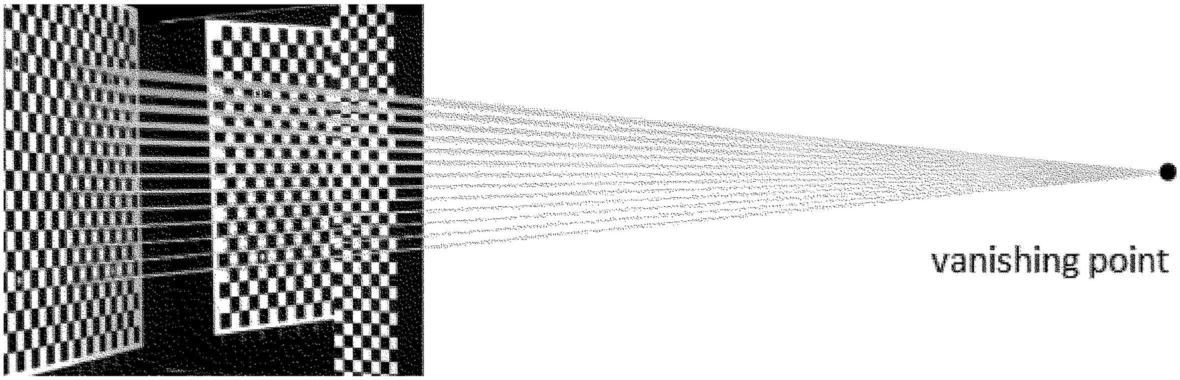
FIG. 6 shows a solution process of image vanishing point according to the embodiment shown in FIGS. 4 and 5.

According to the method described in step 17, obtain the image vanishing point, as shown in FIG. 6. The coordinates of the image vanishing point are: (4430.8061, 544.0210).

Figure 7:
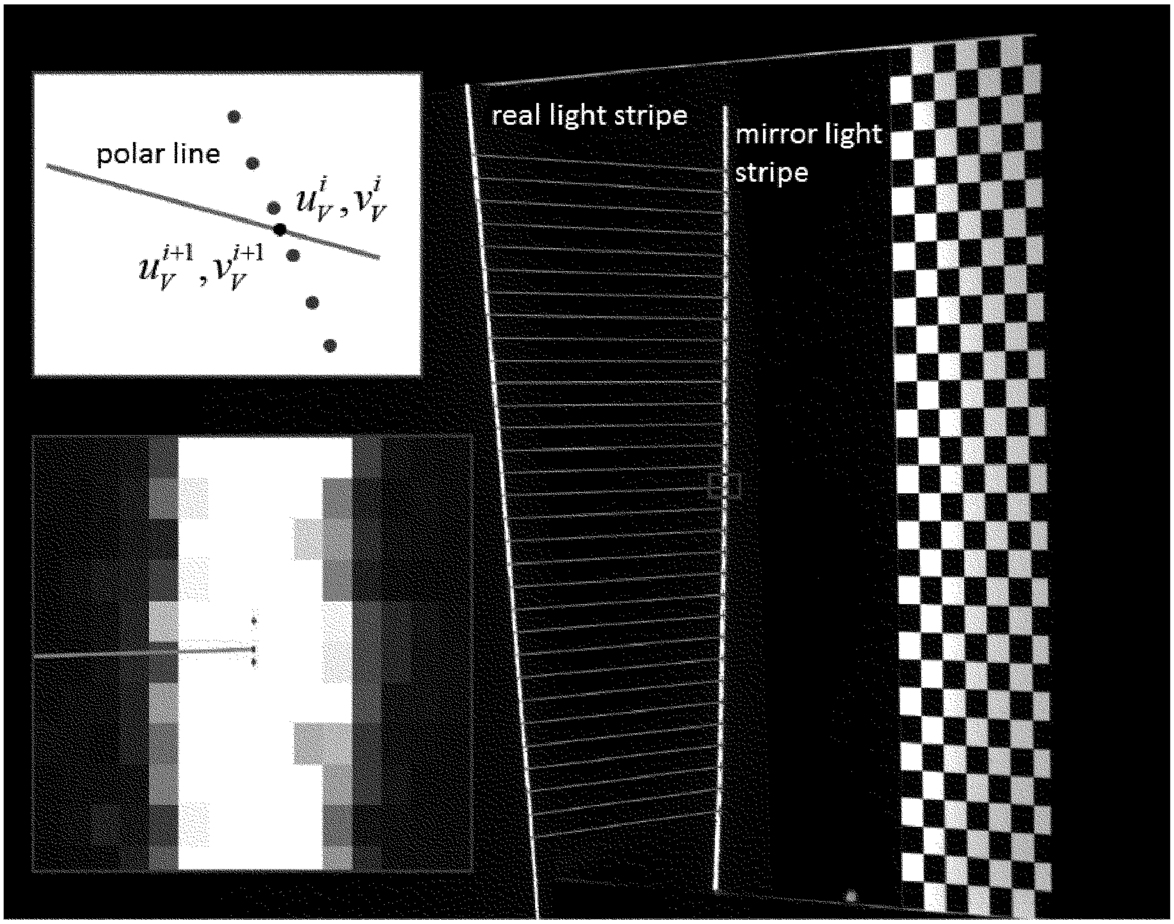
FIG. 7 shows a schematic illustrating a sub-pixel matching image of the center of a light stripe in accordance with the embodiment shown in FIGS. 4 through 6.

According to the method described in step 18, extract the center point of the light stripe and match the sub-pixels of the center point of the light stripe, as shown in FIG. 7. The left light stripe in FIG. 7 is the real light stripe, the right light stripe in FIG. 7 is the mirror light stripe, the upper left corner in FIG. 7 shows the sub-pixel matching method of the center of the light stripe, and the lower left corner in FIG. 7 is the enlarged view of the light stripe center sub-pixel matching.

According to the method described in step 19, the equation of the light plane is X−0.1063Y+0.3541Z−238.7075=0

Coefficients of the equation of the light plane are a=1.0000, b=−0.1063, c=0.3541, d=−238.7075.

According to the method described in step 20, the calibration accuracy of the light plane of structured light is evaluated to be 0.027 mm.

In summary, the present invention provides feature points of micron-level positional accuracy and a larger number of calibration points while ensuring the quality of the light stripe. Compared with conventional structured light parameter calibration methods, the device and method provided by the present invention have higher calibration accuracy and more stable calibration results.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. A structural light parameter calibration device, comprising: a camera, a laser, a front-coating plane minor, a flat glass target, and white printing paper, wherein:

the white printing paper is used to receive a beam projected by the laser and present a real light stripe image;

the laser is a line laser which is used to project the beam onto the white printing paper to form the real light stripe image;

the camera is an area array camera which is used to simultaneously capture the real light stripe image projected by the laser on the white printing paper and a mirror light stripe image in the front-coating plane minor, and calculate a rotation matrix and a translation vector between a coordinate system of the front-coating plane minor and a coordinate system of the camera;

feature points around a front surface of the front-coating plane mirror are used to calculate the rotation matrix and the translation vector between the coordinate system of the front-coating plane mirror and the coordinate system of the camera; coated film in a central area of the front surface of the front-coating plane mirror is used to mirror the real light stripe image projected on the white printing paper and feature points on the flat glass target;

the flat glass target is used to provide constraints for optimizing the rotation matrix and the translation vector between the coordinate system of the front-coating plane mirror and the coordinate system of the camera, and to calculate a vanishing point of an image, and match the real light stripe image and the minor light stripe image by using the vanishing point.

2. The structural light parameter calibration device of claim 1, wherein the front-coating plane mirror uses a double-sided polished optical glass.

3. The structural light parameter calibration device of claim 1, wherein the feature points around the front-coating plane mirror are in the form of a checkerboard, a dot matrix or a grid; a positional accuracy of the feature points is on the order of micrometers; the central area of the front surface of the front-coating plane mirror is coated with an aluminum film or a silver film; a surface accuracy of the front-coating plane mirror is less than λ, λ is a wavelength of visible light in the unit of nm, and a reflectivity of the front-coating plane mirror is ≥92%; and a light source with adjustable brightness is provided on a back of the front-coating plane mirror.

4. The structural light parameter calibration device of claim 1, wherein a front surface of the flat glass target is engraved with checkerboard feature points, dot matrix feature points or grid feature points, a light source with adjustable brightness is provided on a back of the flat glass target, and a positional accuracy of the feature points is on the order of micrometers.

5. The structural light parameter calibration device of claim 1, wherein the white printing paper has a flat surface without apparent visible crease, and is non-reflective and light-proof.

6. A structural light parameter calibration method based on a front-coating plane mirror, comprising steps of:

a. calibrating internal parameters of a camera in a line structured light vision sensor; placing a flat glass target and the front-coating plane mirror in a clear imaging area in front of the camera, adjusting a brightness of a light source, and capturing a real feature point image and a mirror feature image on the flat glass target; and correcting the real feature point image and the mirror feature image;

b. establishing a coordinate system of a real camera, a coordinate system of a mirror camera, a coordinate system of the front-coating plane mirror, and a coordinate system of an inverse plane mirror; solving a rotation matrix and a translation vector between the coordinate system of the front-coating plane mirror and the coordinate system of the real camera; solving a rotation matrix and a translation vector between the coordinate system of the mirror camera and the coordinate system of the real camera, solving a transformation relationship between a left-handed image coordinate system and a right-hand image coordinate system, and establishing a virtual binocular measurement model; obtaining an optimal solution of the rotation matrix and the translation vector between the coordinate system of the front-coating plane mirror and the coordinate system of the real camera by using a nonlinear optimization method;

c. calculating a distance between adjacent feature points in a horizontal direction and a vertical direction of a flat glass target; determining and selecting candidate feature points based on a threshold, and matching the candidate feature points; obtaining an image vanishing point by using a least square method; and d. placing white printing paper in a clear imaging area in front of the camera for multiple times, extracting a center of a real light stripe image and a center of a mirror light stripe image respectively, matching subpixels of the center of the real light stripe image and the center of the mirror light stripe image according to the vanishing point, calculating three-dimensional coordinates of a center point of the real light stripe image using the virtual binocular measurement model, fitting a light plane by using a least square method, and solving light plane parameters.

7. The structural light parameter calibration method of claim 6, wherein the placing a flat glass target and the front-coating plane mirror in a clear imaging area in front of the camera, adjusting a brightness of a light source, and capturing a real feature point image and a mirror feature image on the flat glass target in step a comprises steps of:

placing a flat glass target capable of freely moving in the clear imaging area in front of the camera; forming an angle between the front-coating plane mirror and the flat glass target; ensuring that feature points on the flat glass target and mirrored feature points thereof, as well as most of feature points of the front-coating plane mirror are located in the clear imaging area; and adjusting brightness of light sources of the front-coating plane mirror and the flat glass target separately, such that the feature points thereon are clearly imaged, a width of the feature points and a width of edge pixels are 1-3 pixels.

8. The structural light parameter calibration method of claim 6, wherein the establishing a coordinate system of a real camera, a coordinate system of a mirror camera, a coordinate system of the front-coating plane mirror, and a coordinate system of an inverse plane mirror; solving a rotation matrix and a translation vector between the coordinate system of the front-coating plane mirror and the coordinate system of the real camera; solving a rotation matrix and a translation vector between the coordinate system of the mirror camera and the coordinate system of the real camera, solving a transformation relationship between a left-handed image coordinate system and a right-hand image coordinate system, and establishing a virtual binocular measurement model; obtaining an optimal solution of the rotation matrix and the translation vector between the coordinate system of the front-coating plane mirror and the coordinate system of the real camera by using a nonlinear optimization method in step b comprises steps of:

(1) establishing a right-handed coordinate system for the coordinate system of the real camera, the coordinate system of the mirror camera, the coordinate system of the front-coating plane mirror, and the coordinate system of the inverse plane mirror, wherein an origin of a coordinate system of the real camera is in an upper left corner of an image, and an origin of a coordinate system of a mirror camera image is in an upper right corner of the image;

(2) after the feature points on the front-coating plane mirror are extracted, calculating a homography matrix by using a camera imaging model, and then solving the rotation matrix and the translation vector between the coordinate system of the front-coating plane mirror and the coordinate system of the real camera;

(3) respectively solving the rotation matrix and the translation vector between the coordinate system of the front-coating plane mirror and the coordinate system of the inverse plane minor, and the rotation matrix and the translation vector between the coordinate system of the inverse plane mirror and the coordinate system of the mirror camera by using a mirror principle, and solving the rotation matrix and the translation vector between the coordinate system of the mirror camera and the coordinate system of the real camera by using the above-obtained rotation matrixes and the translation vectors;

(4) converting the left-handed image coordinate system to the right-hand image coordinate system, establishing image coordinates of a mirrored light stripe captured by the real camera in the left-handed coordinate system due to mirroring reasons, while maintaining an ordinate of a principal point of the image unchanged, establishing image coordinates of a mirror stripe in the right-hand image coordinate system, and establishing the virtual binocular measurement model based on a transformation matrix and the translation vector between the coordinate system of the mirror camera and the coordinate system of the real camera solved in step (3) as well as an internal parameter matrix obtained by camera calibration; and (5) using a minimum distance between a measured value and a true value of adjacent feature points in the horizontal direction and the vertical direction on the flat glass target as a spatial distance constraint, obtaining the optimal solution of the rotation matrix and the translation vector between the coordinate system of the front-coating plane minor and the coordinate system of the real camera, and the optimal solution of the rotation matrix and the translation vector between the coordinate system of the real camera and the coordinate system of the mirror camera by using a Levenberg-Marquardt nonlinear optimization method.

9. The structural light parameter calibration method of claim 6, wherein the calculating a distance between adjacent feature points in the horizontal direction and the vertical direction of the flat glass target; determining and selecting candidate feature points based on a threshold, and matching the candidate feature points; obtaining an image vanishing point by using a least square method in step c comprises steps of:

(1) extracting and matching real feature points on the flat glass target and mirror feature points; according to the optimal solution of the rotation matrix and the translation vector between the coordinate system of the real camera and the coordinate system of the mirror camera, substituting the image coordinates of the real feature points on the flat glass target and the image coordinates of the corresponding mirror feature points into the virtual binocular measurement model established in step b respectively, to calculate three-dimensional coordinates of the real feature points on the flat glass target in coordinate system of the real camera; calculating a spacing of two adjacent feature points in the horizontal direction and in a vertical direction on the flat glass target respectively; and selecting a feature point whose spacing is smaller than a set spacing threshold as a real candidate feature point;

(2) connecting the real candidate feature point on the flat glass target and a mirror candidate feature point corresponding to the real candidate feature points with a line, using this line as a matching polar line, taking a distance from the image vanishing point to the polar line as an objective function, and solving an intersection of all lines by using a linear least square method, wherein the intersection is the image vanishing point.

10. The structural light parameter calibration method of claim 6, wherein the placing white printing paper in a clear imaging area in front of the camera for multiple times, extracting the center of a real light stripe image and the center of a mirror light stripe image respectively, matching sub-pixels of the center of the real light stripe image and the center of the mirror light stripe image according to the vanishing point, calculating three-dimensional coordinates of the center point of the light stripe using the virtual binocular measurement model, fitting a light plane by using a least square method, and solving light plane parameters in step d comprises steps of:

(1) securing the front-coating plane mirror in the clear imaging area in front of the camera; adjusting a brightness of the light source to make the feature points on the front-coating plane mirror clear, wherein a width of the feature points and a width of edge pixels are 1-3; placing the white printing paper in the clear imaging area in front of the camera for multiple times; projecting the laser beam onto the white printing paper and forming a clear and complete mirror image in front of the front-coating plane mirror; when the white printing paper is placed at each position, the camera simultaneously capturing a real light stripe image projected on the white printing paper and a mirror light stripe image mirrored by the front-coating plane mirror, and using the same as a calibration image;

(2) extracting a center of a light stripe of the real light stripe image and the mirror light stripe image on the calibration image respectively by using a Steger method;

connecting the center of the real light stripe image and the image vanishing point obtained in step c with a line, and using this line as a polar line of the center of the current light stripe; and locating two points on the center of the mirrored light stripe closest to the polar line as two candidate points and connecting the two candidate points, and using an intersection of the polar line and the line connecting the two candidate points as a sub-pixel matching point of the center of the real light stripe; and (3) substituting image coordinates of the center of the real light stripe and image coordinates of the sub-pixel matching point into the virtual binocular measurement model established in step b, to calculate three-dimensional coordinates of the center point of the light stripe, and fitting a light plane equation $aX+bY+cZ+d=0$ by using the least square method, wherein a, b, c, d in the equation are the solved light plane parameters.

11. The structural light parameter calibration of claim 2, wherein the feature points around the front-coating plane mirror are in the form of a checkerboard, a dot matrix or a grid; a positional accuracy of the feature points is on the order of micrometers; the central area of the front surface of the front-coating plane mirror is coated with an aluminum film or a silver film; a surface accuracy of the front-coating plane mirror is less than $\lambda$, $\lambda$ is a wavelength of visible light in the unit of nm, and a reflectivity of the front-coating plane mirror is ≥92%; and a light source with adjustable brightness is provided on a back of the front-coating plane mirror.

* * * * *